United States Patent
Mitchell et al.

(10) Patent No.: US 6,197,899 B1
(45) Date of Patent: Mar. 6, 2001

(54) OLEFIN POLYMERIZATION

(75) Inventors: Kent E. Mitchell; Max P. McDaniel; M. Bruce Welch; Elizabeth A. Benham; Grover W. Cone, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 08/395,125

(22) Filed: Feb. 27, 1995

Related U.S. Application Data

(63) Continuation of application No. 07/594,268, filed on Oct. 9, 1990, now abandoned.

(51) Int. Cl.[7] ..................................................... C08F 2/06
(52) U.S. Cl. ........................... 526/64; 526/118; 526/119; 526/124.2; 526/129; 526/153; 526/348.2; 526/348.4; 526/348.5; 526/352; 526/904

(58) Field of Search ............................... 526/64, 118, 119, 526/124.2, 129, 153, 348.2, 348.4, 348.5, 352, 904

(56) References Cited

U.S. PATENT DOCUMENTS

| | | | | |
|---|---|---|---|---|
| 4,325,837 | * | 4/1982 | Capshew et al. ................. | 252/429 B |
| 4,330,433 | * | 5/1982 | Wristers ............................ | 252/429 B |
| 4,422,956 | * | 12/1983 | Arzoumanidis et al. ............ | 502/158 |
| 4,562,168 | * | 12/1985 | Lee ....................................... | 502/107 |

* cited by examiner

*Primary Examiner*—David W. Wu
(74) *Attorney, Agent, or Firm*—Edward L. Bowman

(57) ABSTRACT

A process is disclosed for the particle form polymerization of olefins. The process employs a titanium-containing having hydrocarbon soluble titanium components. The resulting catalyst is pretreated with an organometallic reducing agent prior to the introduction of the catalyst into the polymerization zone to give a catalyst which can be used satisfactorily in a loop reactor with lower levels of cocatalyst.

22 Claims, No Drawings

OLEFIN POLYMERIZATION

This application is a Continuation of application Ser. No. 07/594,268 filed Oct. 9, 1990 now abandoned.

FIELD OF THE INVENTION

The present invention relates to the polymerization of olefins. In one aspect the present invention relates to slurry or particle form polymerization. In another aspect the present invention relates to olefin polymerization using a continuous loop-type reactor. In still another aspect the present invention relates to novel catalyst systems for use in the polymerization of olefins.

BACKGROUND OF THE INVENTION

One of the more common techniques employed for the polymerization of olefins involves carrying the polymerization out in a liquid diluent under conditions such that the polymer is formed in the forms of solid particles such that the reaction product is a slurry of particulate polymer solids suspended in a liquid medium. Such reaction techniques have been referred to as slurry or particle form polymerizations. A particularly desirable method for carrying out such particle form polymerization involves the use of continuous loop-type reactors. Examples of such reactor systems are disclosed in U.S. Pat. No. 3,152,872 and U.S. Pat. No. 4,424,341, the disclosures of which are incorporated herein by reference.

In the past, many of the commercial particle form polymerization processes have used chromium based catalysts. Such processes have, however, also been carried out using titanium based catalyst and organometallic cocatalysts.

When using low levels of cocatalyst in the particle form polymerization the applicants have noted some problems in using a titanium based catalyst. Even though the levels of cocatalysts are high enough to ensure sufficient productivity, it has been observed that with a titanium-containing catalyst system when the level of cocatalyst drops below a certain level there is a tendency for a skin of some type to form within the reactor walls inhibiting heat transfer. On bench scale units where the polymerization is only an hour or so long and where heat transfer is usually not critical the phenomena is usually not observed. However, in commercial scale polymerizations, particularly in loop reactors the phenomena has been observed.

The exact nature of this skin formation is not understood at this time. It has been theorized by the applicants that it may be due to the formation of soluble polymer or soluble catalyst. One theory of the applicants is that it may actually be due to the bleeding off of hydrocarbon soluble species from the catalyst.

An object of the present invention is to provide a method for the particle form polymerization of olefins using a titanium containing catalyst system with a reduced tendency to cause the formation of a skin during the polymerization.

Another object of the present invention is to provide a process for the particle form polymerization of olefins using a titanium based catalyst which can be employed satisfactorily with low cocatalyst levels.

Another object of the present invention is to provide a titanium catalyst which can be used in a commercial scale particle form polymerization without the employment of high levels of cocatalyst.

Other aspects, objects, and advantages of the present invention will be apparent to those skilled in the art having the benefit of the following disclosure.

SUMMARY OF THE INVENTION

In accordance with the present invention there is provided a method for the polymerization of olefins which comprises contacting an olefin with a titanium-containing catalyst under particle form polymerization conditions in a polymerization zone wherein said catalyst is prepared by contacting a particulate titanium-containing catalyst having hydrocarbon soluble titanium components with an organometallic reducing agent prior to the introduction of the catalyst into the polymerization zone.

In accordance with another aspect of the present invention there is provided a catalyst for the polymerization of olefins. The catalyst is prepared by contacting a particulate titanium-containing catalyst having hydrocarbon soluble titanium components with an organometallic reducing agent prior to the introduction of the catalyst into the polymerization zone.

In accordance with a particularly preferred embodiment the titanium-containing catalyst is prepared by contacting a titanium alkoxide and a magnesium dihalide in a suitable liquid to produce a solution, the solution is contacted with a suitable precipitating agent to obtain a solid, the solid after possibly being contacting with olefin to form prepolymer is contacted with titanium tetrachloride, and then the resulting solid is contacted with a hydrocarbyl aluminum compound prior to the introduction of the solid into a polymerization vessel.

DETAILED DESCRIPTION OF THE INVENTION

It is considered that this invention would have application for any particle form polymerization when the catalyst is a titanium-containing catalyst which contains hydrocarbon soluble titanium components. A wide range of such titanium-containing catalysts are known. Some examples of such catalysts include those disclosed in U.S. Pat. Nos. 4,477,586; 4,394,291; 4,325,837; 4,326,988; 4,363,746; 4,329,253; 4,618,661; 4,626,519; 4,555,496; 4,384,982; 4,406,818; and 4,384,982; the disclosures of which are incorporated herein by reference. For the purpose of this disclosure a catalyst is deemed to be a catalyst containing hydrocarbon soluble titanium components if the titanium components are soluble when the catalyst is placed in a $C_4$ to $C_8$ hydrocarbon at a temperature in the range of 0° C. to 110° C.

The organometallic reducing agent that is contacted with the titanium-containing solid catalyst can be selected from generally any of those type of organometallic reducing agents that have in the past been used as cocatalysts with such titanium-containing catalysts. Examples include organometallic compounds such as hydrocarbyl aluminum compounds, hydrocarbyl boron compounds, and hydrocarbyl alkali or alkaline earth metal compounds. Some specific examples of such reducing agents include triethylboron, diethylmagnesium, diethylzinc, n-butyl lithium, and the like. The currently preferred organometallic reducing agent is selected from compounds of the formula $R_mAlZ_{3-m}$ wherein R is a hydrocarbyl group having 1 to 8 carbons, Z is a halogen, hydrogen, or hydrocarbyl group having 1 to 8 carbons, and m is a number in the range of 1 to 3. The currently most preferred organometallic reducing agents are selected from trialkylaluminum compounds, especially triethylaluminum.

The amount of reducing agent employed in pretreating the titanium-containing catalyst can vary over a wide range. The optimum amount needed for the best overall improvement in the particle form polymerization can be determined by routine experimentation. Generally, excess organometallic reducing agent can be used; however, in such cases it is desirable to subject the resulting product to a number of washes with a hydrocarbon solvent to assure that soluble organometallic reducing agent is removed from the catalyst prior to the introduction of the catalyst into the polymerization process.

The invention is particularly useful when applied to a titanium-containing catalyst containing olefin prepolymer of the type disclosed in U.S. Pat. No. 4,325,837. Such catalysts are prepared by reacting a titanium alkoxide with a magnesium dihalide in a suitable liquid to form a solution. The resulting solution is then contacted with a suitable precipitating agent and the resulting solid is contacted with titanium tetrachloride either before or after prepolymer of an olefin is added to the solid.

Examples of the titanium alkoxides include the titanium tetraalkoxides in which the alkyl groups contain 1 to about 10 carbon atoms each. Some specific examples include titanium tetramethoxide, titanium dimethoxide diethoxide, titanium tetraethoxide, titanium tetra-n-butoxide, titanium tetrahexyloxide, titanium tetradecyloxide, titanium tetraisopropoxide, and titanium cyclohexyloxide.

The magnesium halide is preferably selected from magnesium chlorides.

The titanium alkoxide and the magnesium dihalide can be combined in any suitable liquid. Examples include substantially anhydrous organic liquids such as n-pentane, n-hexane, n-heptane, methylcyclohexane, toluene, xylenes, and the like.

The molar ratio of the transition metal compound to the metal halide can be selected over a relatively broad range. Generally, the molar ratio is within the range of about 10 to 1 to about 1 to 10, preferably between about 3 to 1 to about 0.5 to 2; however, more often the molar ratios are within the range of about 2 to 1 to about 1 to 2.

Generally, it is necessary to heat the liquid mixture to obtain a solution. Generally, the components are mixed at a temperature in the range of about 15° C. to about 150° C. The mixing could be carried out at atmospheric pressure or at higher pressures.

The time required for heating the two components is any suitable time which will result in a solution. Generally, this would be a time within the range of about 5 minutes to about 10 hours. Following the heating operation, the resulting solution can be filtered to remove any undissolved material or extraneous solid, if desired.

The precipitating agent is selected from the group consisting of organometallic compounds in which the metal is selected from the metals of Groups I to III of the Mendelyeev Periodic Table, metal halides and oxygen-containing halides of elements selected from Groups IIIA, IVA, IVB, VA, and VB of the Mendelyeev Periodic Table, hydrogen halides, and organic acid halides of the formula R'—C—X wherein R' is an alkyl, aryl, cycloalkyl group or combinations thereof containing from 1 to about 12 carbon atoms and X is a halogen atom.

Some specific examples of such precipitating agents include lithium alkyls, Grignard reagents, dialkyl magnesium compounds, dialkyl zinc compounds, dihydrocarbyl aluminum, monohalides, monohydrocarbyl aluminum dihalides, hydrocarbyl aluminum sesquihalides, aluminum trichloride, tin tetrachloride, silicone tetrachloride, vanadium oxytrichloride, hydrogen chloride, hydrogen bromide, acetyl chloride, benzoyl chloride, propionyl fluoride, and the like.

The amount of precipitating agent employed can be selected over a relatively broad range depending upon the particular activities desired. Generally, the molar ratio of the transition metal of the titanium-containing solid component to the precipitating agent is within the range of from about 10 to 1 to about 1 to 10 and more generally within the range of about 2 to 1 to about 1 to 3. In especially preferred embodiments the catalyst contains an amount of prepolymer sufficient to improve the particle size of the catalyst and ultimately the size of the polymer particles produced in a polymerization reaction.

One way of forming prepolymer involves conducting the precipitation in the presence of an aliphatic mono-1-olefin. Another technique involves contacting the precipitated solid with an aliphatic mono-1-olefin under suitable conditions to form prepolymer. This can be done either before or after the solid is treated with titanium tetrachloride. Examples of olefins which can be used for forming prepolymer include ethylene, propylene, 1-butene, 1-pentene, 1-hexene, 1-heptene, 4-methyl-1-pentene, 1-heptene, 1-octene, and the like and mixtures of one or more thereof. The weight of prepolymer based on the total weight of the prepolymerized catalyst is generally in the range of from about 1 to about 90 wt. %, more preferably about 1 to about 20 wt. %, and still more preferably about 1 to about 15 wt. %.

The relative ratios of the titanium tetrachloride to the solid can vary over a wide range; however, as a general rule, the weight ratio of the titanium tetrachloride to the prepolymerized or unprepolymerized solid would generally be within the range of about 10 to 1 to about 1 to 10, more generally about 7 to 1 to about 1 to 4.

The pretreatment of the titanium-containing catalyst with an organometallic reducing agent prior to the introduction of the catalyst into the polymerization zone is preferably carried out in a substantially inert liquid, generally a hydrocarbon. The term organometallic reducing agent as used herein refers to generally those same type of organometallic reducing agents that have been used in the past as cocatalysts for transition metal based olefin polymerization catalysts systems. As noted above a preferred type of reducing agent includes organoaluminum compounds such as triethylaluminum, trimethylaluminum, diethylaluminum chloride, ethylaluminum dichloride, ethylaluminum sesquichloride, methylaluminum sesquichloride, triisopropylaluminum, dimethylaluminum chloride, tridecylaluminum, trieicosylaluminum, tricyclohexylaluminum, triphenylaluminum, 2-methylpentyldiethylaluminum, triisoprenylaluminum, methylaluminum dibromide, ethylaluminum diiodide, isobutylaluminum dichloride, dodecylaluminum dibromide, dimethylaluminum bromide, diisopropylaluminum chloride, methyl-n-propylaluminum bromide, di-n-octylaluminum bromide, diphenylaluminum chloride, dicyclohexylaluminum bromide, methylaluminum sesquibromide, ethylaluminum sesquiiodide, and the like and mixtures thereof.

Preferably conditions are employed in all the catalyst preparation steps to minimize the presence of oxygen and water. The contacting can be carried out over a broad range of temperature conditions. Typically, the contacting would be conducted at a temperature in the range of about 15° C. to about 150° C., more typically, about 20° C. to about 100° C. after the contacting the mother liquor is generally decanted and the resulting solids washed several times with a suitable liquid solvent such as a hydrocarbon.

The amount of organometallic reducing agent employed can vary over a broad range. Excess organometallic reducing agent can be employed. Generally the organometallic reducing agent would be used in an amount such that the molar ratio of the reducing agent to the titanium in the catalyst to be treated is in the range of about 0.01:1 to about 10:1, more preferably about 0.02:1 to about 3:1.

The resulting pretreated catalyst may if desired be mixed with a particulate diluent such as, for example, silica, silica-alumina, silica-titania, magnesium dichloride, magnesium oxide, polyethylene, polypropylene, and poly (phenylene sulfide), prior to the use of the catalyst in a polymerization process. The weight ratio of the particulate diluent to the catalyst can be varied over a wide range. Typically, the weight ratio of the particulate diluent to the catalyst is generally within the range of about 100 to 1 to about 1 to 100, or more often in the range of about 20 to 1 to about 2 to 1. The use of a particulate diluent has been found to be particularly effective in facilitating the controlled charging of the catalyst to the reactor.

The pretreated catalyst can be used in the polymerization of a variety of polymerizable compounds. It is particularly useful for the homopolymerization or copolymerization of mono-1-olefins. Olefins having 2 to 18 carbon atoms would most often be used. The pretreated catalyst is particularly useful in slurry or particle form polymerization processes. In particle form polymerization processes the temperature and pressure conditions are generally selected to assure that polymer can be recovered as discreet particles. Typically, this would involve temperatures in the range of about 60 to about 110° C. More generally, about 80 to about 110° C. The inventive pretreated catalyst is particularly useful in situations where the cocatalyst is triethylaluminum and the level of triethylaluminum used in the polymerization is less than about 25 ppm, based upon the weight of the liquid diluent used in the polymerization, more preferably the triethylaluminum is used at a level in the range of about 5 to about 10 ppm based on the weight of the liquid diluent used in the polymerization.

In a continuous process, for example, a suitable reactor such as a loop reactor is continuously charged with suitable quantities of liquid diluent, catalyst, cocatalyst, polymerizable compounds and hydrogen, if any, in any desirable order. The reactor product is continuously withdrawn and the polymer recovered as appropriate, generally by flashing the liquid diluent and unreacted monomers and drying and recovering the resulting polymer.

The olefin polymer is produced with this invention can be used in preparing articles by conventional polyolefin processing techniques such as injection molding, rotational molding, extrusion of film, and the like.

A further understanding of the present invention and its objects and advantages will be provided by the following examples:

EXAMPLE I

Catalyst Preparations

Under a nitrogen atmosphere n-hexane, dry $MgCl_2$ and titanium tetraethoxide, $Ti(OEt)_4$ were combined. The stirred mixture was heated to 100° C. and held at this temperature for one hour. The mixture was cooled to 26° C. ethylaluminum dichloride (EADC) as a 25 wt. % solution in n-hexane was added to the stirred reaction mixture over a period of sixty minutes. After an additional 30 minutes, stirring was discontinued and the solids allowed to settle. The solids were washed and decanted with dry n-hexane followed by successive washing and decantation with two additional portions of dry n-hexane.

The reactor contents were then treated at ambient temperature with ethylaluminum dichloride (EADC) as a 25 wt. % solution in n-hexane. The addition of the EADC solution to the stirred reaction mixture required about 30 minutes.

Then ethylene was added to the reactor at ambient temperature by pressuring and repressuring an ethylene metering tank, to form polyethylene (prepolymer) on the catalyst in the reactor. The reactor was purged of ethylene with nitrogen and the "prepolymerized" catalyst was washed and decanted successively with two portions of dry n-hexane. Finally, dry n-hexane was added to the reactor.

Then titanium tetrachloride was gradually added to the reaction mixture and the system was stirred for one hour at about 25° C. After the solids were allowed to settle, the mother liquor was decanted and the solids were washed and decanted with dry n-hexane. The solids were then washed and decanted successively with four additional portions of dry n-hexane. The catalyst slurry in dry n-hexane was transferred under nitrogen to a storage tank.

Two identical catalyst preparations gave about 402.5 lb of catalyst slurry in dry n-hexane for use in the inventive pretreatment of the catalyst with triethylaluminum (TEA).

A 20 lb sample of the catalyst slurry (15.57% solids containing 7.4 wt. % Ti) under nitrogen was transferred from the storage tank to the reactor and stirred for 10 minutes at ambient temperature. A 0.75 lb quantity (3.0 moles) of triethylaluminum was added to the reactor as a five pound portion of a 15 wt. % n-hexane solution and the stirred reaction mixture was heated to 50° C. After two hours at 50° C., the system was cooled to 30° C. and the mother liquor decanted. The solids were washed and decanted successively with four 5 gal. portions of dry n-hexane before transferring the treated catalyst as a hexane slurry into a storage tank. The estimated molar ratio of aluminum (from added triethylaluminum) to titanium present in the catalyst was about 3:2.2. This TEA pre-treated catalyst will be referred to herein as Catalyst A.

TABLE II

3-Day Continuous
Pilot Plant Copolymer Resin Runs With TEA-Pretreated Catalyst

|  | Run 5 | Run 6 | Run 7 | Run 8 | Run 9 | Run 10 |
|---|---|---|---|---|---|---|
| Hydrogen Concentration (Mole Percent) | 1.56 | 1.53 | 1.57 | 1.37 | 1.64 | 2.18 |
| $H_2/C_2^-$ Mole Ratio | 0.18 | 0.21 | 0.21 | 0.17 | 0.21 | 0.29 |
| Triethylaluminum (ppm) | 11 | 10 | 10 | 12 | 9 | 8 |
| 1-Hexene, Wt % of Ethylene | 0 | 3.3 | 3.4 | 15.0 | 14.9 | 14.9 |
| Polymer Melt Index | 4.2 | 15.2 | 18.2 | 14.5 | 19.7 | 27.2 |
| HLMI/MI[a] | 37 | 29 | 18 | 21 | 42 | 30 |
| Polymer Density (g/cc) | 0.968 | 0.967 | 0.966 | 0.960 | 0.960 | 0.961 |
| Flexural Modulus, MPa | 1689 | 1770 | 1671 | 1515 | 1472 | 1563 |
| Productivity (g Polymer/g Catalyst/Hr) (including silica) | 2040 | 2040 | 2040 | 2080 | 1520 | 1890 |
| Polymer Bulk Density (lb/ft$^3$) | 23.1 | 23.5 | 23.8 | 22.1 | 22.8 | 24.5 |

[a]HLMI/MI represents High Load Melt Index/Melt Index

Referring to runs 5, 6, 7, 8, 9 and 10 in Table II it can be seen that the TEA level in the reactor at start-up was 11 ppm and varied between 8 ppm and 12 ppm over a 3 day period of continuous operation. During this period there was no detectable fouling problem and activity was essentially unchanged.

Referring to runs 6, 7, 8, 9 and 10 the effect of adding 1-hexene to the reactor can be seen. In general, the melt index increased as the 1-hexene was increased. Density decreased with increasing 1-hexene and flexural modulus decreased as expected. The somewhat lower values of HLMI/MI were most likely due to the higher reactor temperatures used in runs 6–10. Bulk density remained relatively constant at the lower TEA levels.

The results in Table II show that the inventive TEA-pretreated catalyst permits the use of lower levels of TEA in the loop reactor during the copolymerization of ethylene and 1-hexene. No reactor fouling was detectable during 3 days of continuous operation.

EXAMPLE IV

The results of pilot plant runs based on five days of continuous operation using Catalyst A are summarized in Table III. In order to facilitate feeding of the inventive pretreated catalyst, the TEA-pretreated catalyst was diluted with 600° C. calcined silica. Here again the dilution was at the rate of about 3 to about 5 parts by weight of silica per part by weight of Catalyst A. The reactor temperatures in runs 11, 12, 13, 14, 15 and 16 were, respectively, 180° F., 182° F., 189° F., 191° F., 191° F. and 191° F. The TEA levels in these runs were, respectively, 9, 5, 5, 4, 2 and 2.

TABLE III

5-Day Continuous
Pilot Plant Copolymer Resin Runs With TEA-Pretreated Catalyst

|  | Run 11 | Run 12 | Run 13 | Run 14 | Run 15 | Run 16 |
|---|---|---|---|---|---|---|
| Hydrogen Concentration (Mole Percent) | 1.95 | 1.99 | 2.05 | 2.06 | 1.97 | 2.09 |
| $H_2/C_2^-$ Mole Ratio | 0.24 | 0.26 | 0.27 | 0.31 | 0.25 | 0.27 |
| Triethylaluminum (ppm) | 9 | 5 | 5 | 4 | 2 | 2 |
| 1-Hexene, Wt % of Ethylene | 14.4 | 14.8 | 14.9 | 15.3 | 15.8 | 6.6 |
| Polymer Melt Index | 38 | 42.2 | 64 | 118.7 | 59.9 | 34 |
| HLMI/MI[a] | 24 | NA[b] | 15 | NA[b] | NA[b] | NA[b] |
| Polymer Density (g/cc) | 0.960 | 0.959 | 0.960 | 0.959 | 0.958 | 0.962 |
| Flexural Modulus, MPa | 1544 | NA[b] | 1498 | NA[b] | NA[b] | NA[b] |
| Productivity (g Polymer/g Catalyst/Hr) (including silica) | 3640 | 3610 | 4650 | 3030 | 3130 | 3450 |
| Polymer Bulk Density (lb/ft$^3$) | 24.8 | 25.2 | 26.4 | 26.4 | 26.3 | 26.1 |

[a]HLMI/MI represents High Load Melt Index/Melt Index
[b]NA represents Not Available Referring to runs 11, 12, 13, 14, 15 and 16 in Table III it can be seen that the TEA level in the reactor at start-up was 9 ppm and was gradually reduced down to 2 ppm over a 5 day period of continuous operation. During this period there was no detectable fouling problem and activity was essentially unchanged.

The general comments made in the previous example relating to the results summarized in Table II also apply to the results shown in Table III. It should be noted that on decreasing the TEA level in the reactor loop to 0.5 ppm the activity dropped sharply and the operation was terminated.

Since the overall drop in density was slight considering the relatively large amount of 1-hexene present, it can be concluded that the TEA treatment did not significantly affect the comonomer incorporation, even at lower reactor temperatures. It is noteworthy that, e.g., in run 14 with very high hydrogen and very high 1-hexene, the melt index was a very high 118.7.

TABLE V

| Catalyst Pretreatment Conditions | | |
| --- | --- | --- |
| Catalyst | TEA Solution (lbs) | Reaction Temperature (° C.) |
| C | 5.0 | 60 |
| D | 0.5 | 60 |
| E | 0.5 | 20 |
| F | 5.0 | 20 |
| G | 2.75 | 40 |

Hexane slurries of each of the catalysts and of the original untreated commercial scale Control catalyst were subjected to analytical tests to determine the relative amounts of soluble titanium components. The results are set forth in Table VI.

Table VI

| | Analytical Results | | | | | | |
| --- | --- | --- | --- | --- | --- | --- | --- |
| | | Supernatant Liquid (ppm) | | | Dried Catalyst (wt. %) | | |
| Catalyst | Color | Al | Ti | Mg | Al | Ti | Mg |
| C | black | 95.0 | 1.8 | 0.5 | 5.8 | 12.8 | 7.2 |
| D | lt. brown | 0.2 | 4.5 | 0.1 | 2.3 | 14.1 | 7.4 |
| E | lt. brown | <0.1 | 0.3 | <0.1 | 2.4 | 14.0 | 7.6 |
| F | black | 92.6 | 0.2 | <0.1 | 5.2 | 12.8 | 6.9 |
| G | dk. brown | 24.0 | <0.1 | <0.1 | 4.2 | 13.0 | 6.7 |
| Control | lt. brown | 0.2 | >1699.1 | 0.2 | 1.6 | 14.0 | 7.4 |

Treatment of the Control catalyst slurry with TEA at different concentrations and temperatures resulted in soluble titanium levels under 5 ppm in all cases.

EXAMPLE VII

The effectiveness of the TEA treated catalysts of Example VI in polymerization was then compared to that of the untreated Control catalyst.

A one gallon capacity reactor was used for the polymerization. The reactor was prepared for each polymerization run by adding about one liter of isobutane, heating to 110° C. for one hour, draining the reactor, and then flushing it with nitrogen free isobutane. Catalyst slurry and TEA cocatalyst were added to the reactor. The reactor was sealed and hydrogen added. About 2 liters of isobutane was pressured into the reactor. Ethylene was then fed to the reactor continually over a one hour period so that constant pressure was obtained. At the end of the hour, the ethylene flow was stopped, and the reactor was vented. The polymer was collected, vacuum dried at 60° C., and weighed.

The polymerizations were run in 1.1 Kg of isobutane, 90 g 1-hexene, and 0.5 cc of 15% by weight triethylaluminum in n-heptane at 90° C. and 324 psig total pressure for one hour. The hydrogen was measured into the reactor in the amount of 25 psi from a 2.25 l vessel. Reactant molar ratios were 0.7 hexene/ethylene and 0.05 hydrogen/ethylene at an ethylene concentration of about 7 mole percent. The results are summarized in Table VII.

TABLE VII

| | | Productivity (kg/g/hr) | | | | |
| --- | --- | --- | --- | --- | --- | --- |
| Run | Catalyst[a] | From Catalyst Weight | From Ti Analyses | MI (g/10 min) | HLMI/MI Ratio | Density (g/cc) |
| 24 | G | 24 | 18 | 1.26 | 27.3 | .9429 |
| 25 | D | 23 | 20 | 1.68 | 27.4 | .9443 |
| 26 | E | 25 | 23 | 1.65 | 27.4 | .9435 |
| 27 | F | 21 | 18 | 1.62 | 27.0 | .9433 |
| 28 | G | 24 | 25 | 1.39 | 27.6 | .9440 |
| 29 | Control | 26 | 23 (25)[b] | 1.16 | 30.7 | .9439 |

[a]Fluff bulk densities ranged only from 14.8–15.4 lbs/cu. ft.
[b]Calculated correcting for Ti in solution.

The data shows that the productivity and polymer molecular weights were slightly reduced by the TEA treatment. The shear ratios, fluff bulk densities, and densities of the polymers were not materially affected by the treatment. The TEA treatment thus reduced the soluble Ti levels of the catalyst without any significant adverse effect on the polymer formed or the performance of the catalyst. By reducing the hydrogen levels it should be possible to increase the molecular weights and productivities to values very close to those obtained with the untreated Control catalyst.

EXAMPLE VIII

Another sries of polymerizations were carried out using the various TEA pretreated catalysts and the Control catalyst to determine whether the TEA pretreatment would affect the type of polymer fines produced. The polymerizations were run in 1.1 Kg of isobutane at 100° C. and 500 psig total pressure for 1 hour. Triethylaluminum, 0.5 cc of 15% by weight solution in n-heptane, cocatalyst was used; hydrogen, 132 psi from a 2.25 l vessel, was in the reactor. The hydrogen/ethylene molar ratio was 0.36 at 6.05 mole percent ethylene. The results are summarized in Table VIII.

TABLE VIII

| | | Productivity (Kg/g/hr) | | | |
| --- | --- | --- | --- | --- | --- |
| Run | Catalyst | From Catalyst Weight | From Ti Analyses | MI (g/10 min.) | Fines (% - 100 Mesh) |
| 30 | C | 12 | 9 | 109 | 2.98 |
| 31 | D | 11 | 12 | 161 | 2.50 |
| 32 | E | 15 | 13 | 121 | 2.38 |
| 33 | F | 11 | 9 | 147 | 3.75 |
| 34 | G | 11 | 8 | 207 | 2.50 |
| 35 | Control | 11 | 8[a] | 192 | 2.29 |

[a]Calculated correcting for Ti in solution.

The data show that the TEA pretreatment does not have any significant adverse effect upon the polymer fines.

EXAMPLE IX

Another series of polymerizations were carried out to evaluate the TEA pretreated Catalyst G at different cocatalyst levels in the co-polymerization of ethylene and 1-hexene. The polymerizations were run in 1.1 Kg isobutane, 90 g 1-hexene, and variable levels of 15% by weight triethylaluminum in n-heptane at 90° C. and 324 psig total pressure for one hour. Hydrogen, 25 psi from a 2.25 l vessel, was also in the reactor. Reactant molar ratios were 0.7 hexene/ethylene and 0.05 hydrogen/ethylene at an ethylene concentration of about 7 mole percent. The results are summarized in Table IX.

TABLE IX

| Run | Triethyl Aluminum (b) (cc) | (ppm)(c) | Productivity (kg/g/hr) | MI (g/10 min.) | HLMI/MI Ratio |
|---|---|---|---|---|---|
| 36 | 3.0 | 286 | 10.0 | 3.78 | 27.4 |
| 37 | 1.5 | 143 | 10.8 | 2.52 | 26.2 |
| 38 | 0.5 | 48 | 25.0 | 1.39 | 27.6 |
| 39 | 0.5 | 48 | 21.3 | 1.74 | 28.3 |
| 40 | 0.25 | 24 | 14.4 | 0.99 | 30.7 |
| 41 | 0.15 | 15 | 3.9 | 1.19 | 26.8 |
| 42 | 0.10 | 10 | ND(a) | ND | ND |

(a)ND = not determined.
(b)TEA was 15% by weight in n-heptane (density = 0.70 g/cc).
(c)PPM based on isobutane.

The data shows that in the bench scale pot-type reactor the productivity in the copolymerization was decreased as the TEA cocatalyst level was decreased. The effect upon productivity is apparently more notable in the bench scale reactor than in a loop reactor.

EXAMPLE X

Another series of catalysts wre prepared to evaluate the effects of other organometallic reducing agents.

The Control catalyst was prepared by forming a solution of titanium tetraethoxide and magnesium chloride. The solution was contacted with ethylaluminum dichloride to obtain a precipitate. Ethylene was polymerized on the precipitate to form prepolymer. The resulting solid was then washed with TiCl$_4$ and then with several hydrocarbon washes.

Separate portions of the resulting control catalyst slurried in hydrocarbon were contacted with different reducing agents, namely triethylaluminum, diethylaluminum, triethylboron, diethylzinc, n-butyllithium, and Magala (a mixture of dibutylmagnesium and triethyaluminum).

The effects of the various catalysts in the polymerization of ethylene was then compared. The polymerizations were carried out in substantially the same manner as those described in Example VII. The variables and results are summarized in Table X.

TABLE X

| Run | TEA (cc) | Hydrogen (psi) | Productivity (Kg/g/hr) | MI (g/10 min.) | HLMI/MI |
|---|---|---|---|---|---|
| Control Catalyst | | | | | |
| 43 | 0.1 | 45 | 6.0 | 0.48 | 36.4 |
| 44 | 0.25 | 50 | 20.7 | 1.02 | 29.5 |
| 45 | 0.5 | 45 | 33.6 | 1.35 | 29.7 |
| 46 | 1.0 | 45 | 41.2 | 1.24 | 29.7 |
| 47 | 2.0 | 35 | 41.2 | 1.28 | 31.8 |
| 48 | 4.0 | 35 | 43.1 | 1.32 | 31.5 |
| 49 | 6.0 | 30 | 39.5 | 1.20 | 30.0 |

TABLE X-continued

| Run | TEA (cc) | Hydrogen (psi) | Productivity (Kg/g/hr) | MI (g/10 min.) | HLMI/MI |
|---|---|---|---|---|---|
| TEA Treated Catalyst | | | | | |
| 50 | 0.1 | 40 | 14.3 | 0.65 | 34.5 |
| 51 | 0.25 | 40 | 21.4 | 0.65 | 30.9 |
| 52 | 0.5 | 40 | 27.8 | 1.47 | 24.6 |
| 53 | 1.0 | 40 | 36.0 | 1.26 | 29.8 |
| DEAC Treated Catalyst | | | | | |
| 54 | 0.05 | 40 | 2.0 | — | — |
| 55 | 0.1 | 40 | 34.4 | 0.89 | 32.6 |
| 56 | 0.25 | 40 | 66.6 | 1.57 | 29.6 |
| 57 | 0.5 | 40 | 53.8 | 2.06 | 27.6 |
| 58 | 1.0 | 57.5 | 1.93 | 28.2 | |
| TEB Treated Catalyst | | | | | |
| 59 | 0.5 | 45 | 51.4 | 1.98 | 28.2 |
| DEZ Treated Catalyst | | | | | |
| 60 | 0.5 | 45 | 33.8 | 1.58 | 28.8 |
| MAGALA Treated Catalyst | | | | | |
| 61 | 0.5 | 45 | 22.1 | 2.0 | 27.8 |
| Butyllithium Treated Catalyst | | | | | |
| 62 | 0.5 | 45 | 37.6 | 0.89 | 37.8 |

In Table X a dash indicates that no determination was made. The results of Table X demonstrate that a particulate titanium catalyst containing soluble titanium components can be effectively treated with a wide range of organometallic reducing agents. It will be noted in many cases the productivity of the organometallic reducing agent treated catalyst was higher than that of the control at a given cocatalyst level. Particularly notable are the triethylboron and diethylaluminum chloride treated catalysts.

That which is claimed is:

1. An improved process for the polymerization of olefins under particle-form polymerization conditions comprising contacting at least one olefin with a catalyst and a cocatalyst in a liquid diluent under particle-form polymerization conditions wherein said catalyst is a solid particulate catalyst prepared by (1) reacting a titanium alkoxide and a magnesium dihalide in a suitable liquid to form a solution;

(2) then reacting that solution with a precipitating agent selected from organoaluminum compounds of the formula $R_m AlZ_{3-m}$ wherein R is a hydrocarbyl group having 1 to 8 carbon atoms, Z is a halogen, hydrogen, or hydrocarbyl group having 1 to 8 carbons, and m is a number in the range of 1 to 3 to produce a solid precipitate;

(3) contacting the solid precipitate with titanium tetrachloride, before or after an optional prepolymerization step to result in titanium tetrachloride treated solid;

(4) contacting the titanium tetrachloride treated solid with an organometallic reducing agent to produce a reducing agent treated solid;

(5) washing the resulting reducing agent treated solid with a hydrocarbon wash liquid to remove hydrocarbon soluble material from the reducing agent treated solid; and (6) separating the washed solid from the hydrocarbon wash liquid so as to yield said solid particulate catalyst, said solid particulate catalyst having less material soluble in the hydrocarbon used as the wash liquid than did the solid of step (4).

2. A process according to claim 1 wherein said polymerization is conducted in a continuous loop reactor.

3. A process according to claim 2 wherein said organometallic reducing agent is selected from the group consisting of hydrocarbyl aluminum compounds, hydrocarbyl boron compounds, hydrocarbyl alkali or alkaline earth metal compounds, and hydrocarbyl zinc compounds.

4. A process according to claim 2 wherein said organometallic reducing agent is selected from the group consisting of compounds of the formula $R_mAlZ_{3-m}$ wherein R is a hydrocarbyl group having 1 to 8 carbons, Z is a halogen, hydrogen, or a hydrocarbyl group having 1 to 8 carbons, and m is a number in the range of 1 to 3.

5. A process according to claim 4 wherein said catalyst contains 1 to 10 wt. % of an olefin prepolymer.

6. A process according to claim 5 wherein said olefin prepolymer is deposited on said precipitated solid prior to the solid being contacted with the titanium tetrachloride.

7. A process according to claim 6 wherein said titanium alkoxide is selected from the group consisting of titanium alkoxides in which the alkyl groups contain 1 to 10 carbon atoms each and said precipitating agent is an organoaluminum halide.

8. A process according to claim 7 wherein said organometallic reducing agent is selected from the group consisting of trialkylaluminum compounds.

9. A process according to claim 8 wherein said trialkylaluminum compound is triethylaluminum.

10. A process according to claim 9 wherein said catalyst is prepared by reacting titanium tetraethoxide and magnesium dichloride in a suitable liquid to form a solution, then reacting the solution with an organoaluminum compound selected from the group consisting of ethylaluminum sesquichloride and ethylaluminum dichloride, contacting the solid with ethylene under conditions sufficient to form polyethylene prepolymer, and then contacting the resulting solid with titanium tetrachloride.

11. A process according to claim 10 wherein after said catalyst is contacted with said organoaluminum compound it is slurried with dehydrated silica in a liquid diluent to produce a titanium based silica diluted catalyst before said catalyst is introduced into the polymerization zone.

12. A process according to claim 8 wherein said titanium alkoxide is titanium tetraethoxide.

13. A process according to claim 12 wherein said precipitating agent is selected from the group consisting of ethylaluminum sesquichloride and ethylaluminum dichloride.

14. A process according to claim 13 wherein the prepolymer is formed using ethylene.

15. A process according to claim 14 wherein the cocatalyst is present in an amount of less than about 25 parts per million by weight based on the weight of the liquid polymerization diluent.

16. A process according to claim 15 wherein the cocatalyst is present in an amount of no more than about 10 parts per million based on the weight of the liquid polymerization diluent.

17. A process according to claim 16 wherein said cocatalyst comprises triethylaluminum.

18. A polymerization process comprising preparing a solid particulate catalyst by
   (1) reacting a titanium alkoxide and a magnesium dihalide in a suitable liquid to form a solution;
   (2) then reacting that solution with a precipitating agent selected from organoaluminum compounds of the formula $R_m AlZ_{3-m}$ wherein R is a hydrocarbyl group having 1 to 8 carbon atoms, Z is a halogen, hydrogen, or hydrocarbyl group having 1 to 8 carbons, and m is a number in the range of 1 to 3 to produce a solid precipitate;
   (3) contacting the solid precipitate with titanium tetrachloride, before or after an optional prepolymerization step to result in titanium tetrachloride treated solid;
   (4) contacting the titanium tetrachloride treated solid with an organometallic reducing agent to produce a reducing agent treated solid;
   (5) washing the resulting reducing agent treated solid with a hydrocarbon wash liquid to remove hydrocarbon soluble material from the reducing agent treated solid; and
   (6) separating the washed solid from the hydrocarbon wash liquid so as to yield said solid particulate catalyst, said solid particulate catalyst having less material soluble in the hydrocarbon used as the wash liquid than did the solid of step (4) and using said particulate catalyst with a cocatalyst in a liquid diluent for the polymerization of at least one olefin under particle form polymerization conditions.

19. A process according to claim 18 wherein said titanium tetralkoxide is titanium tetraethoxide, said precipitating agent is selected from ethylaluminum sesquichloride and ethylaluminum dichloride, the solid precipitate of step (2) is subjected to prepolymerization with ethylene prior to being treated with titanium tetrachloride in step (3), said reducing agent is trialkylaluminum, and said cocatalyst is trialkylaluminum.

20. A process according to claim 18 wherein ethylene is polymerized to produce polyethylene homopolymers.

21. A process according to claim 18 wherein ethylene and 1-hexene are polymerized to produce an ethylene 1-hexene copolymer.

22. A process according to claim 18 wherein ethylene and at least one other 1-olefin having 3 to 8 carbon atoms is polymerized to produce an ethylene copolymer.

* * * * *